United States Patent
Gann

(10) Patent No.: US 9,435,627 B2
(45) Date of Patent: Sep. 6, 2016

(54) WHEEL ALIGNMENT DEVICE

(71) Applicant: Alignment Simple Solutions, LLC, Birmingham, AL (US)

(72) Inventor: Gary Gann, Pelham, AL (US)

(73) Assignee: Alignment Simple Solutions, LLC, Birmingham, AL (US)

( * ) Notice: Subject to any disclaimer, the term of this patent is extended or adjusted under 35 U.S.C. 154(b) by 85 days.

(21) Appl. No.: 14/510,889

(22) Filed: Oct. 9, 2014

(65) Prior Publication Data

US 2016/0102963 A1    Apr. 14, 2016

(51) Int. Cl.
*G01B 5/25* (2006.01)
*G01B 5/255* (2006.01)

(52) U.S. Cl.
CPC ........... *G01B 5/255* (2013.01); *G01B 2210/10* (2013.01)

(58) Field of Classification Search
CPC ........................... G01B 5/255; G01B 2210/10
USPC ....................... 33/203, 203.18, 203.19, 203.2
See application file for complete search history.

(56) References Cited

U.S. PATENT DOCUMENTS

| | | | |
|---|---|---|---|
| 1,985,330 A * | 12/1934 | Starr | G01B 5/255 33/301 |
| 2,160,226 A | 5/1939 | Phillips | |
| 2,590,722 A | 3/1952 | Otis | |
| 2,628,430 A | 2/1953 | Krumm | |
| 3,426,991 A | 2/1969 | Rishovd | |
| 3,709,451 A | 1/1973 | Graham | |
| 3,793,736 A | 2/1974 | Cufrini | |
| 4,167,817 A | 9/1979 | Hunter | |
| 4,285,136 A | 8/1981 | Ragan | |
| 4,337,581 A | 7/1982 | Eck | |
| 4,338,027 A | 7/1982 | Eck | |
| 4,636,175 A | 1/1987 | Frazzell et al. | |
| 4,718,759 A | 1/1988 | Butler | |
| 4,800,651 A | 1/1989 | Hanlon | |
| 4,803,785 A | 2/1989 | Reilly | |
| 5,029,395 A * | 7/1991 | Brauer | G01B 7/315 33/203.18 |
| 5,048,192 A * | 9/1991 | Pascoal | G01B 5/255 33/203.18 |
| 5,056,231 A * | 10/1991 | Alusick | G01B 5/255 33/203.18 |
| 5,179,784 A | 1/1993 | Kowis | |

(Continued)

FOREIGN PATENT DOCUMENTS

WO    WO8904947 A1    6/1989

OTHER PUBLICATIONS

Jeep 4WD How to: Front Wheel Alignment Using Affordable, Accurate Equipment; 4wdmechanix.com; Dec. 17, 2013.

(Continued)

*Primary Examiner* — G. Bradley Bennett
(74) *Attorney, Agent, or Firm* — Baker, Donelson, Bearman, Caldwell & Berkowitz, PC

(57) ABSTRACT

A wheel alignment device (10) is disclosed having a base crossbar (12), a top crossbar (14), a right stanchion (15) and a left stanchion (16) coupled to the base and top crossbar, and a stabilizing rod (17) to maintain the stanchions parallel to each other. The base crossbar has two lower rim engaging posts (22) and oppositely disposed ends (25) each having an inwardly extending tape measure holding slot (26). The top crossbar has two upper rim engaging posts (33). The right and left stanchions each an elongated top mounting slot (41) therethrough through which a threaded post (46) of an upper fastening knob (47) passes to slidably coupled the top crossbar to the stanchions.

12 Claims, 4 Drawing Sheets

(56) References Cited

U.S. PATENT DOCUMENTS

| | | | |
|---|---|---|---|
| 5,471,754 A | 12/1995 | Mieling | |
| 5,781,286 A * | 7/1998 | Knestel | G01B 11/2755 33/203.18 |
| 5,797,190 A | 8/1998 | Matson | |
| 6,438,855 B1 | 8/2002 | Bremer | |
| 7,150,105 B1 * | 12/2006 | Battaglia | G01B 5/255 33/203.18 |
| 8,480,099 B2 | 7/2013 | Porta et al. | |
| 2002/0170195 A1 * | 11/2002 | Corghi | G01B 5/255 33/520 |
| 2003/0030791 A1 | 2/2003 | O'Harra | |
| 2004/0172170 A1 | 9/2004 | Lesert | |
| 2005/0206098 A1 * | 9/2005 | Ohnesorge | B60B 7/18 279/46.1 |
| 2011/0146089 A1 * | 6/2011 | Gray | G01B 5/255 33/288 |
| 2011/0279814 A1 | 11/2011 | Grogan | |

OTHER PUBLICATIONS

Haweka Alignment Sytems; techplus.ie; Dec. 17, 2013.

* cited by examiner

WHEEL ALIGNMENT DEVICE

TECHNICAL FIELD

This invention relates generally to wheel alignment devices, and more particularly to portable wheel alignment devices.

BACKGROUND OF THE INVENTION

Vehicles such as cars, trucks, or the like typically include a chassis upon which wheels are mounted. The wheels must be positioned or aligned in their proper positions to ensure that the vehicle rides in a straight path along the roadway. Wheel alignment is an important part of vehicle service which must be done periodically to restore the wheels to their true positions to reduce unnecessary wear upon the tires. Wheel alignment includes the calibration of the toe, camber, and caster of the wheels.

Wheel alignment may be accomplished at professional garages wherein large machines utilizing specialized lights, lasers and computer devices are coupled to the vehicle. These devices require a large area, are expensive to purchase, and require experience to properly operate.

Accordingly, there is a need in the art for a simple and portable device for aligning the wheels of a vehicle. It is to the provision of such therefore that the present invention is primarily directed.

SUMMARY OF THE INVENTION

In a preferred form of the invention a wheel alignment device comprises a pair of elongated stanchions having an upper portion and a lower portion, a base crossbar coupled to the lower portion of the pair of stanchions, a stabilizing rod coupled to the pair of stanchions, and a top crossbar slidably coupled to the upper portion of the pair of stanchions for movement along the pair of stanchions. The base crossbar includes at least two lower rim engagement posts and two oppositely disposed ends each having a tape measure mounting device. The top crossbar also includes at least two upper rim engagement posts.

DETAILED DESCRIPTION

Figure 1:
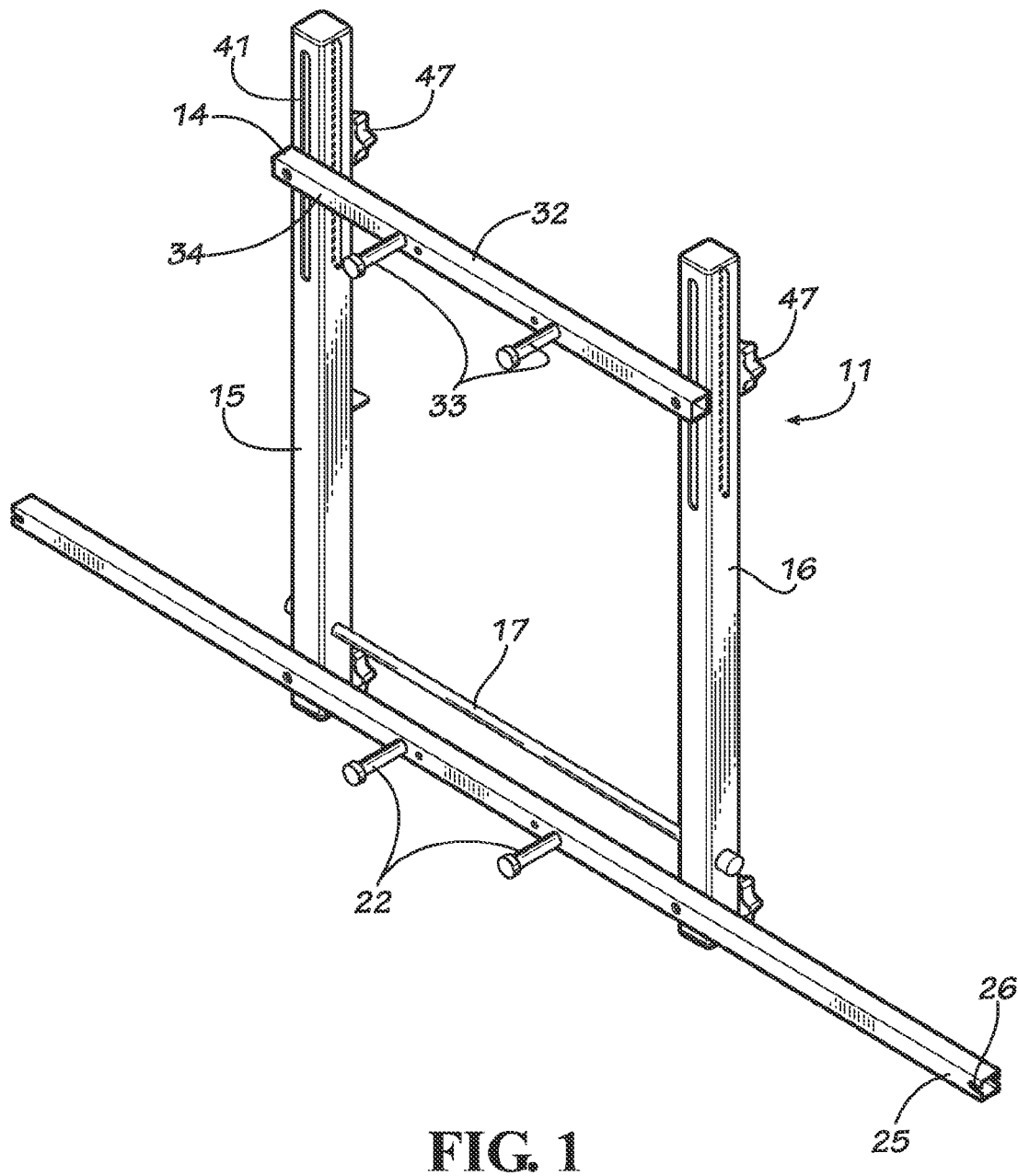
FIG. 1 is a perspective view of the wheel alignment device embodying principles of the invention in a preferred form.

With reference next to the drawings, there is shown a wheel alignment device 10 for a vehicle V according to the present invention. The wheel alignment device 10 includes a frame 11 having a generally horizontal elongated bottom or base crossbar 12, a generally horizontal elongated top crossbar 14, a right stanchion 15, a left stanchion 16, and a stabilizing rod 17.

The base crossbar 12 has a elongated main member 21 and two lower rim engaging posts 22 which extend from a rear surface 23 of the main member and are generally perpendicular to the main member 21. The main member 21 has two oppositely disposed ends 25 each having an inwardly extending tape measure holding slot 26. The main member 21 also has a front surface 28 opposite the rear surface 23 which includes two threaded mounting holes 29.

The top crossbar 14 has a elongated main member 32 and two upper rim engaging posts 33 which extend from a rear surface 34 of the main member 32 and are generally perpendicular to the main member 32. Each top crossbar upper rim engaging post 33 generally is vertically aligned with a corresponding lower rim engaging post 22 of the base crossbar 12. The main member 32 also has a front surface 35 opposite the rear surface 34 which includes two threaded mounting holes 36.

Figure 2:
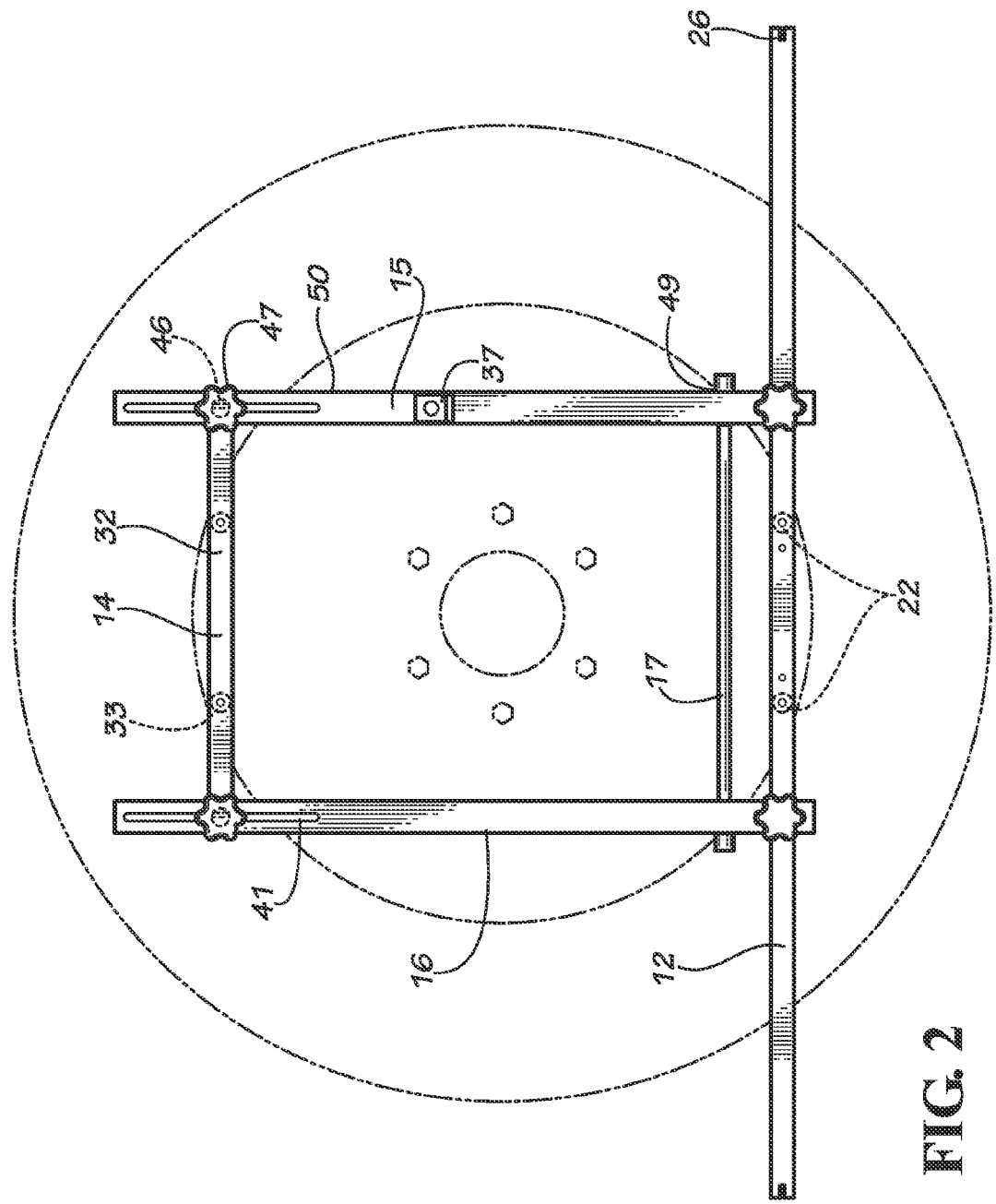
FIG. 2 is a side view of the wheel alignment device of FIG. 1, shown mounted upon a vehicle wheel.
Figure 3:
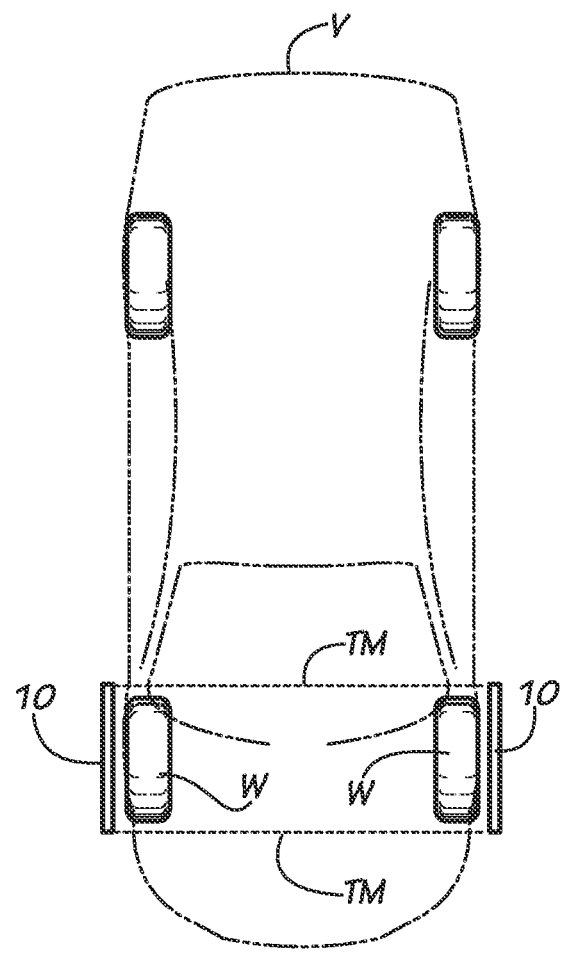
FIG. 3 is a top view of two wheel alignment devices of FIG. 1, shown mounted upon a vehicle.
Figure 4:
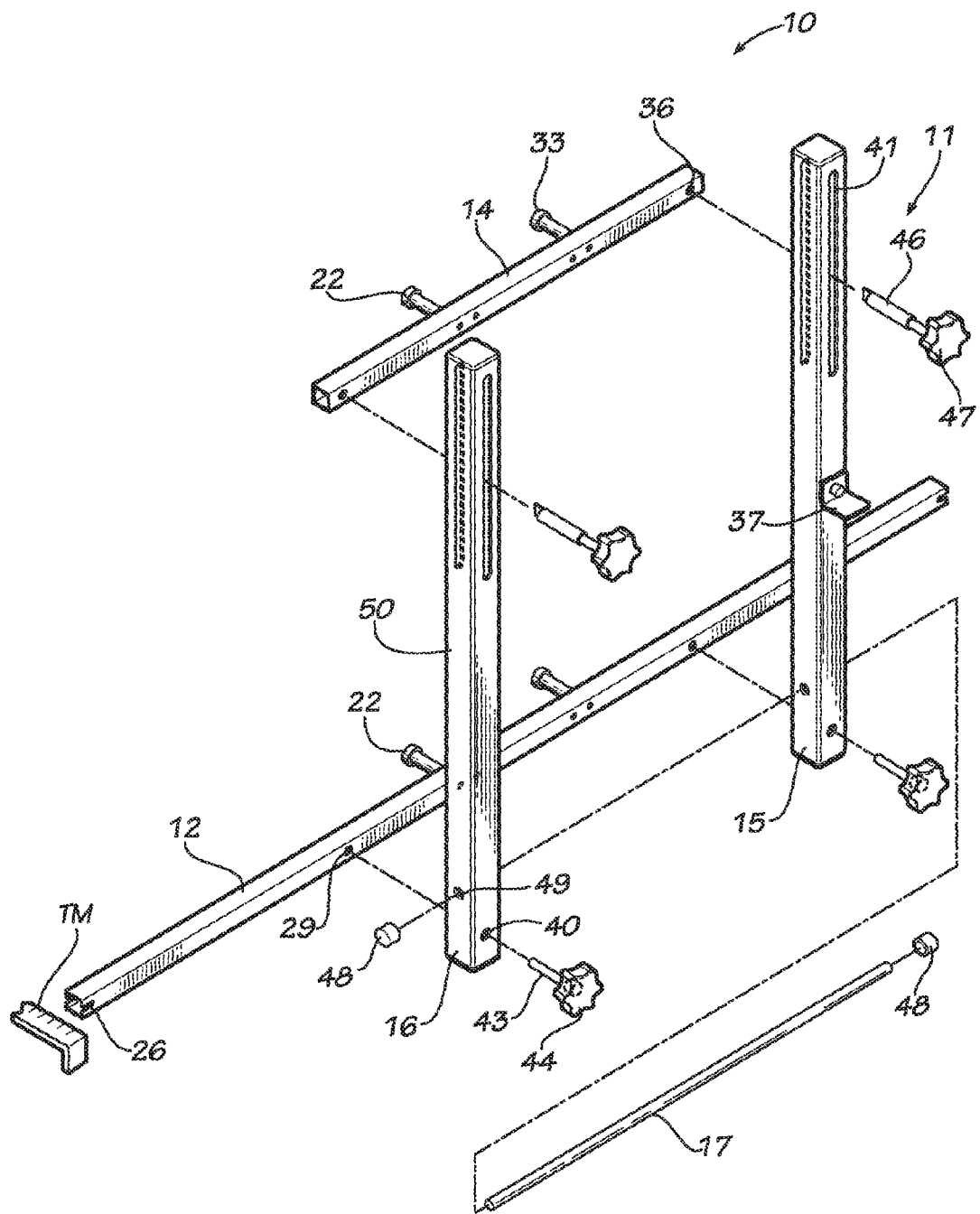
FIG. 4 is an exploded view of the wheel alignment device of FIG. 1.

The right and left stanchions 15 and 16 each have a bottom mounting hole 40 therethrough and an elongated top mounting slot 41 therethrough. The bottom mounting hole 40 is aligned with the base crossbar threaded mounting hole 29 so that the threaded post 43 of a lower fastening knob 44 passes through bottom mounting hole 40 and is threaded into the threaded mounting hole 29 to secure the bottom of each stanchion 15 and 16 to the base crossbar 12. Similarly, the top mounting slot 41 is aligned with the top crossbar threaded mounting hole 36 so that the threaded post 46 of an upper fastening knob 47 passes through top mounting slot 41 and is threaded into the threaded mounting hole 36 to adjustably secure the top of each stanchion 15 and 16 to the top crossbar 14. Each stanchion 15 and 16 also has a stabilizing rod mounting hole 49 extending through the oppositely disposed side surfaces 50 which are configured to snugly receive stabilizing rod 17, the ends of the stabilizing rod 17 are fitted with rubber caps 48 which prevent the stabilizing rod from accidentally being removed from the stanchions. A stanchion, shown in FIGS. 2 and 4 as the right stanchion 15, includes a level mounting bracket 37.

Figure 5:
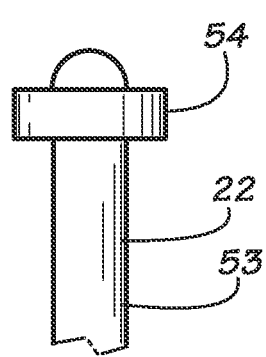
FIG. 5 is a perspective view of the rim engaging post of FIG. 1.

As shown in FIG. 5, each rim engaging post 22 includes an elongated body portion 53 terminating at a magnetic head portion 54. The diameter of the magnetic head portion 54 is greater than the diameter of the body portion 53 so as to enable the head portion 54 to grasp the interior surface of the peripheral flange of a wheel W.

In use, the lower ends of the stanchions 15 and 16 are coupled to the base crossbar 12 by passing the threaded post 43 of the lower fastening knobs 44 through the bottom mounting holes 40 of the stanchions and threading them into the threaded mounting holes 29 of the base crossbar 12 until the base crossbar is pressed tightly against the stanchions. The stabilizing rod 17 is also passed through the stabilizing rod mounting holes 49 of the stanchion to maintain the stanchions in a substantially mutually parallel configuration perpendicular to the base crossbar. Similarly, the threaded posts 46 of the upper fastening knobs 47 are passed through the top mounting slots 41 of the stanchions and threaded into the threaded mounting holes 36 of the top crossbar 14, the upper fastening knobs 47 are not yet being fully tightened so as to allow relative travel or movement between the top crossbar 14 and the stanchions 15 and 16.

With the wheel alignment device 10 assembled, one wheel alignment device 10 is mounted upon each front wheel W of a vehicle. The wheel alignment device 10 is mounted to the wheel W by positioning the lower rim engaging posts 22 of the base crossbar 12 against or in abutment with the interior lip of the wheel's peripheral flange. With the stanchions 15 and 16 in a vertical orientation, the top crossbar 14 is then moved upwardly until its upper rim engaging posts 33 abut the interior lip of the wheel's peripheral flange, the elongated top mounting slot 41 allowing limited vertical travel of the upper fastening knob 47 and top crossbar 14. The upper fastening knobs 47 are then rotated so that they tighten down upon the top crossbar 14 so as to lock the position of the top crossbar 14 against the stanchions 15 and 16. A leveler device is positioned upon the level mounting bracket 37 to measure, adjust for and insure that the stanchions are vertically oriented.

A pair of tape measuring device or tape measure TM are then coupled to the two wheel alignment devices 10 by passing the free end of the tape measures into the tape measure holding slots 26 at each end of the base crossbar 12, stretching the measuring tapes beneath the vehicle, and coupling the measuring tapes to the opposite tape measure holding slots 26 of the oppositely disposed base crossbar 12. With the tape measures in position the distance between each end of the base crossbars 12 can be measured or identified. Now, the wheel's toe angle may be adjusted in conventional fashion with the tape measures continually indicating the measurement or distance between the two ends of the two wheel alignment devices 10, used to calculate the toe angle, until the desired wheel position is achieved.

Figure 6:
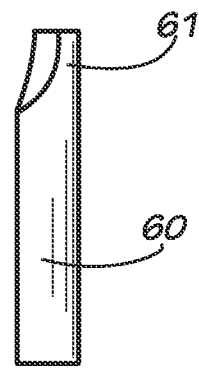
FIG. 6 is a perspective view of a rim engaging post of FIG. 1 in another configuration.

FIG. 6 shows a rim engaging post 60 in another preferred form of the invention. Here, the rim engagement post 60 has a head portion 61 which is formed or tapered so that it grasps the exterior edge of the peripheral flange of a wheel.

Thus, the base crossbar 12, top crossbar 14, stanchions 15 and 16 and stabilizing rod 17 are all separate and distinct pieces or components that may be disassembled from each other and stowed longitudinally together in a compact configuration to minimize storage space requirements. Additionally, the wheel alignment device does not require a large amount of space to accomplish the alignment task, as the space requirements is essentially contained within the size of the vehicle itself.

It should be understood the positions of the right and left stanchion mounting holes 40 and top mounting slots 41 may be reversed, which would still enable the relative distance between the base crossbar 12 and the top crossbar 14 to be adjusted.

It should also be understood that the stabilizing rod 17 aids in maintaining the stanchions 15 and 16 generally parallel to each other and in a generally perpendicular orientation to the base crossbar 12 without the aid of the top crossbar. This is a distinct advantage as this eliminates the need of manually maintaining the stanchions in the correct position while mounting the wheel alignment device to the wheel and adjusting the position of the top crossbar 14. The snug fitting between the stabilizing rod 17 and the corresponding stabilizing bar mounting holes 49 enable the stabilizing rod to be quickly coupled to the stanchions and removed thereafter to disassemble the wheel alignment device for subsequent storage.

It should also be understood that as an alternative to the tape measure holding slots other tape measure mounting devices may be used such as clasps, clamps, catches, magnets, hook and loop type fasteners, adhesive tape, adhesive, or the like to hold a tape measure relative to the base crossbar. Also, an electronic tape measure reflecting off the opposite base crossbar may also be utilized, wherein the tape measure mounting device would include the device for holding the electronic tape measure.

It should be understood that the terms bar, members, stanchions, tubes, rod, and the like are equivalent and therefore interchangeable used herein.

While this invention has been described in detail with particular reference to the preferred embodiments thereof and the best mode of practicing same, it will be understood that variations and modifications can be effected within the spirit and scope of the invention as described herein above and as set forth in the appended claims.

The invention claimed is:

1. A wheel alignment device comprising,
a pair of elongated stanchions, each stanchion having an upper portion and a lower portion;
a base crossbar coupled to said lower portion of said pair of stanchions, said base crossbar including at least two lower rim engagement posts and two oppositely disposed ends each having a tape measure mounting device;
a stabilizing rod coupled to said pair of stanchions, and
a top crossbar slidably coupled to said upper portion of said pair of stanchions for movement along said pair of stanchions, said top crossbar including at least two upper rim engagement posts.

2. The wheel alignment device of claim 1 wherein said stabilizing rod is oriented generally parallel with said base crossbar.

3. The wheel alignment device of claim 2 wherein each said stanchion includes a stabilizing rod mounting hole therethrough configured to snugly receive said stabilizing rod.

4. The wheel alignment device of claim 1 wherein said tape measure mounting device is an inwardly extending slot.

5. The wheel alignment device of claim 1 wherein said upper portion of each said stanchion includes an elongated slot, and wherein said top crossbar is coupled to said stanchions through a threaded post extending through each said stanchion elongated slot and threadable coupled to said top crossbar.

6. The wheel alignment device of claim 1 wherein said pair of stanchions, said base crossbar, said stabilizing rod and said top crossbar are all separate and distinct components that are removable coupled to form said frame.

7. A wheel alignment device comprising,
at least two generally parallel stanchions;
a first crossbar coupled to said stanchions, said first crossbar including at least two first rim engagement posts, said first crossbar has oppositely disposed ends, each first crossbar end having a tape measure mounting device;
a stabilizing rod coupled to said pair of stanchions and adapted to maintain said stanchions is a generally parallel configuration with each other, and
a second crossbar slidably coupled to said stanchions for lockable longitudinal movement along said stanchions, said second crossbar including at least two second rim engagement posts.

8. The wheel alignment device of claim 7 wherein said tape measure mounting device is an inwardly extending slot.

9. The wheel alignment device of claim 7 wherein each said stanchion includes a stabilizing rod mounting hole therethrough configured to snugly receive said stabilizing rod.

10. The wheel alignment device of claim 7 wherein said stabilizing rod is oriented generally parallel with said first crossbar.

11. The wheel alignment device of claim 7 wherein each said stanchion includes an elongated slot, and wherein said first crossbar is coupled to said stanchions through a threaded post extending through each said stanchion elongated slot and threadable coupled to said second crossbar.

12. The wheel alignment device of claim 7 wherein said stanchions, said first crossbar, said stabilizing rod and said second crossbar are all separate and distinct components.

\* \* \* \* \*